United States Patent [19]

Brain

[11] 3,824,393

[45] July 16, 1974

[54] SYSTEM FOR DIFFERENTIAL PARTICLE COUNTING

[75] Inventor: Alfred E. Brain, Santa Cruz, Calif.

[73] Assignee: American Express Investment Management Company, San Francisco, Calif.

[22] Filed: Oct. 1, 1973

[21] Appl. No.: 402,656

Related U.S. Application Data

[60] Continuation of Ser. No. 174,936, Aug. 25, 1971, abandoned, which is a division of Ser. No. 44,503, June 6, 1970, abandoned.

[52] U.S. Cl............... 250/222 PC, 250/339, 356/39
[51] Int. Cl............................................. H01j 39/12
[58] Field of Search........... 356/39, 40, 41, 42, 102, 356/103, 207, 208; 250/222 PC, 226, 339

[56] References Cited

UNITED STATES PATENTS

| | | | |
|---|---|---|---|
| 2,927,219 | 3/1960 | Young | 250/222 PC |
| 2,959,348 | 11/1960 | Nassenstein | 250/222 PC |
| 3,315,229 | 4/1967 | Smithline | 356/39 |
| 3,327,119 | 6/1967 | Kamensky | 250/43.5 |
| 3,349,227 | 10/1967 | Martens | 356/102 |
| 3,412,254 | 11/1968 | Meyer-Doring | 356/39 |
| 3,493,772 | 2/1970 | Daughters | 250/222 PC |
| 3,503,684 | 3/1970 | Preston | 350/162 SF |

*Primary Examiner*—James W. Lawrence
*Assistant Examiner*—D. C. Nelms

[57] ABSTRACT

A system for differentiating and counting particles and in particular nucleated particles such as white blood cells. The presence in the field of view of a particle of the type to be differentiated and counted is detected and an image of the field scanned by a television camera. An analog to digital converter samples the television camera output to provide a digital data representation of the intensity of a sampled field of picture elements of predetermined resolution. The digital data is processed by a digital computer including a memory for storing the sampled field of picture elements. Picture elements corresponding to a particle to be analyzed are circumscribed by box-finding algorithms and digital data corresponding to picture elements enclosed by the box are analyzed for parameters used in identifying the particle. Particles are identified by a distance measure or criterion of closeness to selected prototype particle points in an *n* dimensional space according to a preselected set of *n* parameters. Focus is automatically preserved during microscope imaging of a specimen passed beneath the microscope objective to insure reliable data for processing.

4 Claims, 11 Drawing Figures

SYSTEM FOR DIFFERENTIAL PARTICLE COUNTING

This application is a continuation of application Ser. No. 174,936 filed Aug. 25, 1971, now abandoned, which is a division of Ser. No. 44,503 filed June 6, 1970, now abandoned.

This invention relates to a new and improved system for automatically differentiating and identifying particles and, in particular, to an automated system for identifying and counting nucleated particles such as white blood cells or other biological cells.

Differential leucocyte counts from specimen blood smears provide essential data for the diagnosis of disease and are carried out in most hospitals on a routine basis. Because a great number of samples or specimens must be evaluated on a continuous basis, an automated system for performing this task would be of great practical benefit. There is general professional agreement among physicians that a greater number of differential white blood counts should and would be made if reliable automatic equipment were available to perform the task. The complexity involved in differentiation of white blood cells, however, constitutes a significant hurdle to such automation.

Differential leucocyte counts are generally carried out on smears of peripheral blood, for example, from the finger tip, prepared on a one inch by three inch glass microscope slide. According to the conventional procedure for specimen preparation, a spot of blood is placed on a slide and is smeared across the slide using the edge of a second slide. The specimen slide is thereafter warm dried and placed in a Coplin jar containing a conventional stain such as Wright's Stain, and the excess stain is thereafter washed off. The preparation is highly standardized but there is considerable variation in the composition of the stain and in the concentration of stain on the specimen. The entire subject has been thoroughly reviewed by T. A. Harper in *The Peripheral Blood Film*, Butterworths London, England 1968.

In the conventional leucocyte count, 200 white cells are identified by category. The most common leucocytes or white blood cells are the neutrophils which constitute approximately 65 percent of the white cells. The neutrophil has an irregular elongate or even multiparticulate nucleus surrounded by a larger area of cytoplasm. Lymphocytes, next most common in occurrence, constitute 25 percent of the white blood cells and have a generally uniform nucleus approaching a circular configuration and often relatively little cytoplasm. Monocytes, constituting approximately 6 percent of the white blood cells, are the largest of the white blood cells containing a nucleus of slightly irregular to uniform configuration in a large area of cytoplasm. The eosinophils comprise only about 2 percent of the white blood cells, while the basophils occur even less frequently, amounting to less than 1 percent of the white blood cells. These cells are characterized by granules distributed throughout the cell and distinct coloration among other features. Proper identification of these rarer cells is extremely important. In the blood smear, the white blood cells are generally dispersed at a relatively low density throughout a crowded background of red blood cells which contain no nucleus. Other blood constituents and artifacts are also infrequently found in the smear.

According to general practice, the smear is viewed through a microscope by a physician or technician and a count of the different categories of white blood cells is tabulated on a manual counter having keys corresponding to each of the types of white blood cells. Fast, efficient and accurate counting requires considerable experience and even then there is nonuniformity of result and disagreement over the category into which a particular cell should fall. Thus, confusion may often exist between large lymphocytes and monocytes and between young neutrophils and monocytes. Various attempts have been made at automating the task of differential leucocyte counting such as, for example, U.S. Pat. No. 3,315,229. Such systems, however, are extremely complex and have generally not provided the accuracy necessarily required for medical diagnosis.

It is therefore an object of the present invention to provide a new digitally computerized system for differential leucocyte counting incorporating powerful logic and specially designed peripheral equipment sufficient to generate the accuracy necessary for medical diagnosis and at a commercially viable speed.

In order to accomplish these results, the present invention generally contemplates a system comprising a microscope arrangement for imaging a particle field of predetermined size on the scanning target of, for example, a television camera, and means for determining the presence in the particle field of a particular particle to be identified and counted. Analog to digital converter means samples the output of the television camera to provide digital data representative of the inventory of picture elements of the particle field which is stored in the memory of a digital computer. The computer logic provides means for circumscribing the picture elements defining a particle to be differentiated and counted so that it is only necessary for the computer to perform a detailed analysis on a circumscribed portion of the digital data in identifying the particle. Identification is based upon a distance measure or criterion of closeness to a set of $m$ prototype points in an $n$ dimensional space representing prototypes of the different categories of white blood cells derived from historical data and on the basis of a novel and characteristic determinative set of parameters derived from the stored data. The microscope arrangement includes means for preserving focus during scanning of an imaged particle field.

According to one feature of the invention, means is provided for determining the presence of a particle or cell of the type to be identified and counted in the particle field imaged on a scanning target in order to initiate data processing of the imaged field. In one embodiment a beamsplitter is positioned in the image beam path from the microscope to direct a first portion of image light along a first path to the scanning target and to direct a second portion of image light across a row of photocells. The outputs from the photocells are connected to logic circuitry including a coincidence circuit for generating a ready signal indicating the presence in the imaged field of the type of particles to be identified and counted. In a preferred form of the invention, a first source of light in the infrared range continuously illuminates the particle field imaged by the microscope, while a second light source provides only flash illumination of the particle field upon the occurrence of a ready signal. The beamsplitter consists of a dichroic mirror which transmits the infrared light to a row of photocells for determining the presence of a particle to be identified and for providing a ready signal to trigger flash illumination of the particle field with visible light. The visible image light is reflected by the dichroic mirror beamsplitter onto the scanning target for data processing.

According to another aspect of the invention, the digital computer comprises a memory for storing digital data representing a sampled field of picture elements from the imaged particle field. The computer comprises means for sampling elements of this first sampled field to provide a less dense second sampled field of the picture elements. Digital data corresponding to the second less dense sampled field is analyzed to determine particle thresholds according to the intensity of the picture elements. A box-finding algorithm thereafter generates an enclosure for circumscribing the elements of the second particle field defining a particle. The computer thereafter analyzes the elements of the first sampled field enclosed by the box. A feature and advantage of this arrangement is that detailed analysis of the high density first sampled field of picture elements does not have to be carried out for the entire particle field but only that portion or region circumscribed by the box-finding algorithm.

In a refinement of this method, the elements of the first sampled field enclosed by the defined box are first analyzed for redetermining the location of particle thresholds using the more dense elements of the first sampled field to provide a more accurate determination. The box for enclosing particle defining elements which can also be visualized as a tabular look-up restriction is thereafter redefined again to more accurately enclose the particle defining elements of the first sampled field for detailed analysis and particle identification.

In a preferred box-finding algorithm for use in identifying white blood cells and, in particular, to facilitate differentiating neutrophils, lymphocytes and monocytes, the elements of the less dense second sample field comprising the particle nucleus are inventoried and identified according to whether the elements are interior or exterior elements of the nucleus. According to this algorithm, there is added to the nuclear area, all picture elements of the second sampled field not belonging to the nucleus but adjacent to an exterior nucleus element thereby deriving a new nuclear area. The box or enclosure for circumscribing elements of the second sample field is thereafter defined on the basis of the derived nuclear area. A feature and advantage of this method is that a significant amount of nuclear area is added to a cell such as a neutrophil which has an irregular shaped nucleus, whereas very little nuclear area is added to a cell such as lymphocyte or monocyte in which the nucleus tends to be of regular configuration. Such a routine is necessary so that the enclosing box for the neutrophil is large enough to include the significant area of cytoplasm which is found in a neutrophil.

The invention is particularly directed to nucleated particles such as white blood cells and other biological cells. From intensity data about the gray-scale of the picture elements constituting the particle field, the invention contemplates differentiating nucleated particles by determining the nuclear area $A$, the nuclear parameter $P$ and generating the parameter $P^2/A$. To provide additional accuracy in particle determination, the computerized system can also be adapted for determining the gray-scale level for the average illuminated nuclear intensity, the average illuminated intensity of non-nuclear portions of the particles, and the difference between the average nuclear and the non-nuclear intensities. As a further refinement in nucleated particle identification, the invention also contemplates determining the area of non-nuclear portions of the particle and the ratio of nuclear to non-nuclear areas. Finally, a parameter related to the minimum illuminated intensity can also be determined.

On the basis of some of all of the above-mentioned parameters, the system incorporates the capability of categorizing the particle into $m$ categories on the basis of the $n$ selected characteristic parameters by first establishing $m$ prototype points in an $n$ dimensional space representing the mean value of historical determinations of the $n$ characteristic parameters for known particles in the $m$ categories. The particular $n$ characteristic parameters measured and determined for a particle to be identified and counted are then used to determine the closeness of the particle to the $m$ prototype points using a statistical measure of closeness or distance measure. According to one embodiment of the invention the closeness of a particle to one of the $m$ prototype points is determined by normalizing the parameters with respect to standard deviation along each of the $n$ dimensions and by determining the average distance from any of the $m$ prototype points in standard deviations.

In a refinement of this procedure for categorizing particles on the basis of closeness to $m$ prototype points in an $n$ dimensional space, the invention contemplates selecting a first group of a new set of particles to be identified and counted within a first predetermined average distance from the $m$ prototype points in standard deviations and thereafter updating the $m$ prototype points on the basis of the $n$ characteristic parameters measured and determined from the first group of the set of particles to be differentiated and counted. Thereafter, the remaining particles are categorized on the basis of a second predetermined distance from the updated prototype points in standard deviations.

Because the surface particle field or specimen can vary in thickness and surface depth in the micron range, the invention contemplates a variety of arrangements for preserving and maintaining focus of the microscopically imaged particle field on the scanning target to optimize image information for data processing. In one arrangement, a support is fixed in a position relative to the microscope housing to define a plane spaced from the microscope objective. A transparent slide having its lower surface positioned against means at the defined plane and the upper surface of the transparent slide facing the microscope objective is oriented with a specimen such as a blood smear at its lower surface. Immersion oil having an index of refraction approximately equal to the index of refraction of the transparent slide material is retained within the space between the microscope objective and the slide so that the thickness of material of substantially similar index of refraction between the microscope objective and slide remains constant as the slide is passed beneath the objective despite variations in the thickness of the glass slide.

In another arrangement, a specimen carrier is provided in the form of an elongate tape having one or more specimens formed along one surface thereof. According to this embodiment a transparent plate is provided having its upper surface positioned against support means at a defined plane beneath the microscope objective with the lower surface facing away from the support means and microscope objective. Means is provided for biasing and passing the tape against the lower surface of the transparent plate with the surface of the tape on which the specimen is fixed adjacent the transparent plate whereby the specimen is maintained at a fixed distance from the microscope objective while the tape is passed along the surface of the transparent plate. Immersion oil can be provided in the space between the microscope objective and the surface of the transparent plate and between the transparent plate and elongate specimen carrying plate.

The invention also contemplates an automatic microscope focusing apparatus for applications in which the depth of focus and sample or object thickness are in the micron range. A pair of optical wedges oriented in opposite directions is positioned across the optical axis of the microscope in the image light path and means such as a servo motor is provided translating at least one of the optical wedges to provide an effective optical plate of variable thickness for varying the effective optical image path length. In the system of the present invention, a focusing error signal for driving the motor is derived from the video output of the television camera. The focusing error signal is obtained by using a band pass filter selected with a frequency range in which the video output is a function of the degree of focus of the microscope image on the television camera. It has been found for applications in differential leucocyte countings that a band pass filter in the range of approximately 400 to 900 kilohertz provides a course-focusing control signal while a second band pass filter tuned in approximately the range of 900 to 2,000 kilohertz provides a fine control signal.

Thus, the present invention relates to an entire automated system for performing the task of differential white blood cell counting but is also applicable for other nucleated particles and to particle identifying and counting generally. The system incorporates powerful logic within a special or general purpose digital computer and automatic peripheral equipment. In this respect, the preparation of specimens, blood smears, and other particle samples can itself be automated using equipment such as, for example, the Vickers Cytological Scanning Apparatus (VCSA) manufactured by Vickers in England. This equipment provides for automatic and uniform specimen preparation with specimens spaced apart along a reel of plastic tape. Thus, in combination with this apparatus the entire system can be automated providing results of increased accuracy and uniformity.

Other objects, features and advantages of the present invention will become apparent in the following specification and accompanying drawings.

FIG. 4 is another diagrammatic view of stored data representing a lymphocyte in a particle field in which the lymphocyte is enclosed by a box, while

FIG. 6 is a side cross-sectional diagrammatic view of an arrangement for preserving microscope focus for a specimen fixed on a glass slide while

PARTICLE DETECTION SYSTEMS

Figure 1:
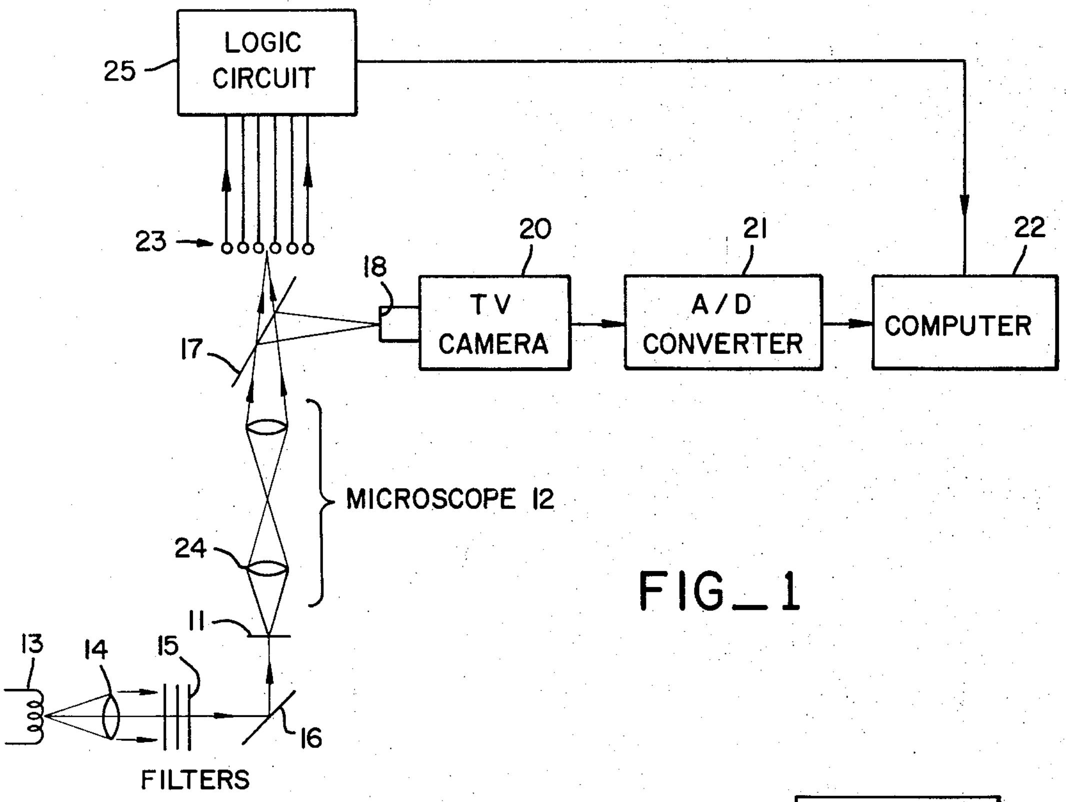
FIG. 1 is a generalized block diagram of a differential particle counting system.

A generalized block diagram of a system for differential particle counting is shown in FIG. 1. A specimen or sample particle field is placed on the stage 11 of microscope 12 and illuminated by a light source consisting of lamp 13, collimating lens 14 appropriately selected filters 15 and mirror 16. The image of the specimen or sample particle field projected by microscope 12 falls on beamsplitter 17 and a portion of the light is directed onto the photo cathode target 18 of a television camera 20. The focused image projected on photo cathode 18 is scanned to generate an analog output signal from the television camera 20 which is sampled by an analog to digital converter 21 to provide digital date about the intensity and location of picture elements of predetermined resolution comprising the image field for storage in a digital computer 22.

Whether or not data about a particle field imaged on the television camera will be processed and read into the computer 22 is determined by an instruction derived from a row or line of photocells 23. The photocells 23 receive a second portion of the focused image light from beamsplitter 17 and the focused image of the cells or other particles is swept across the linear photocell array. Sweeping the focused image of the cell or particle field across the row of photocells can be accomplished by moving the slide on which the specimen is fixed across the microscope stage 11 beneath the microscope objective 24 or by suitable optics for sweeping the focused image light across the row of photocells. The output from the photocells 23 are connected to external logic circuitry 25 arranged to gate the photocell output for detecting the presence of a particular type of particle cell to be counted and for providing a ready signal or other instruction to computer 22. For example, in counting white blood cells, there are typically 500 red cells for every white cell so that the white cells are on the average well separated from each other. Red cells do not have a nucleus while each white cell contains a nuclear area considerably denser and therefore darker than the cytoplasm of either the white cell or red cell, or the background. Thus, a coincidence of three photocells in a row may, for example, indicate the presence of a nucleated cell of the type to be differentiated and counted thereby providing a ready signal for processing the imaged field data and storing it in computer 22. The logic circuitry 25 can also include means to insure that the instruction to the computer to accept data is synchronized with the computer timing and the television camera raster timing. Furthermore, the photocells 23 and logic circuitry 25 should be arranged so that data from the television camera is processed only when the imaged field contains an entire white cell which does not intersect the boundary of the field.

Figure 2:
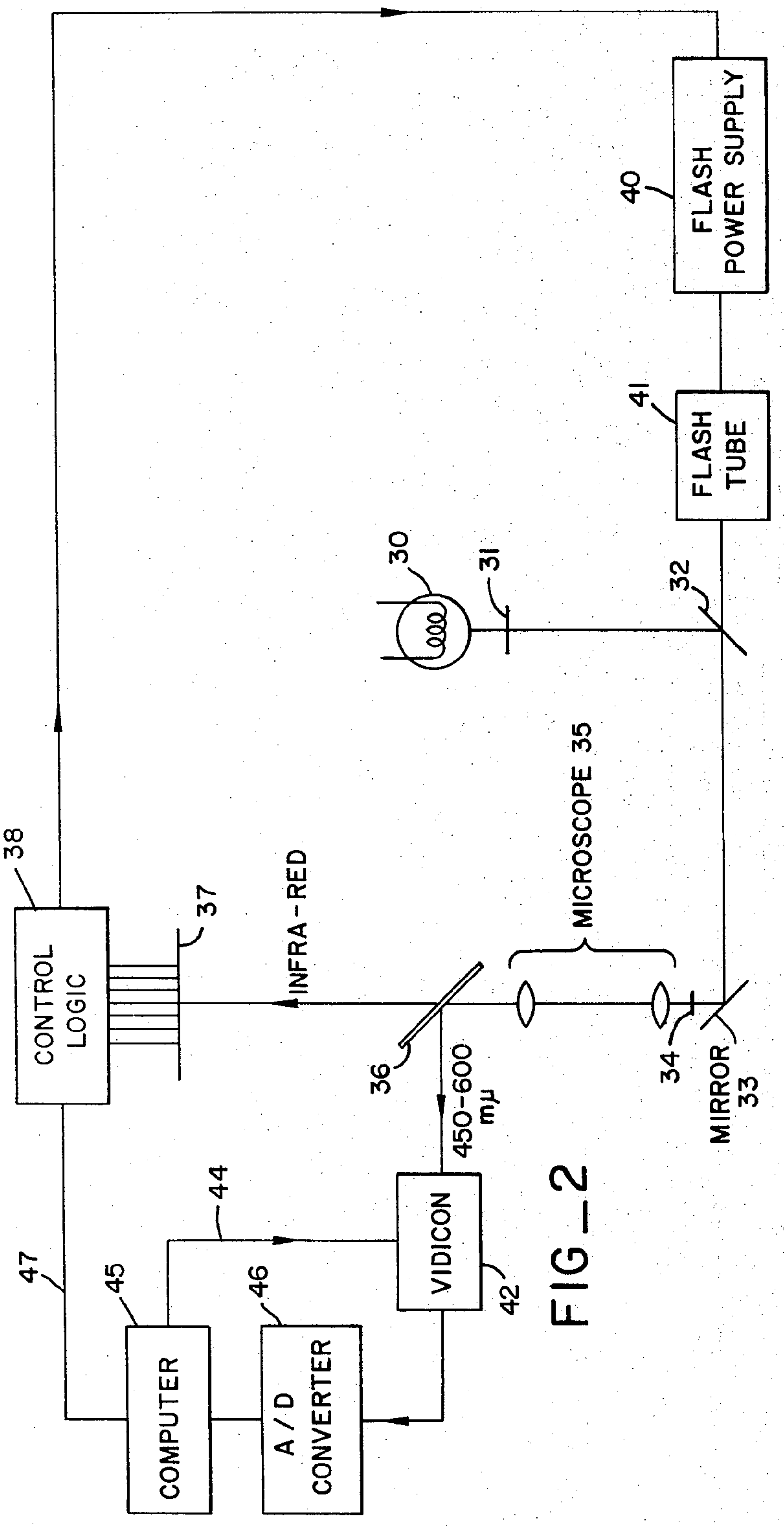
FIG. 2 is a block diagram of another arrangement for differential particle counting.

A generalized block diagram for another arrangement of the differential cell and particle counting system is shown in FIG. 2. A disadvantage of the arrangement of FIG. 1 is that a specimen or sample transport mechanism for intermittent transport across stage 11 is required for successively imaging different fields from the specimen or image onto the television camera 20. Such an intermittent transport mechanism can be a serious factor contributing to loss of focus of the imaged particle field and the arrangement of FIG. 2 therefore provides an arrangement which permits the specimen to continuously move at a constant speed. In order to accomplish this result, two sources of illumination are provided. The first light source is an infrared source consisting of filament lamp 30 and infrared transmitter 31 which via beamsplitter 32 and mirror 33 continuously illuminates the specimen 34 with light in the infrared spectrum. The continuously infrared illuminated specimen field of cells or particles is imaged by microscope 35 through a dichroic mirror 36 onto a row or line of photocells 37 as heretofore described. The dichroic mirror 36 serves the function of a beamsplitter as hereinafter described transmitting that portion of the image light in the infrared spectrum onto the linear array of photocells 37. Upon detection of the presence of a particle of the type to be identified and counted in the imaged particle field by photocells 37 and control logic 38, a ready signal or pulse is generated and directed to the power supply 40 of a flash tube 41 which generates a momentary flash of light in the visible range for illuminating the specimen 34 via beamsplitter 32 and mirror 33. The flash tube 41 can be selected to provide visible light throughout a continuous spectrum of, for example, 450 to 600 m$\mu$. As a result of the generated flash, the visibly illuminated particle or cell field of specimen 34 is imaged by microscope 35 and the visible image light is reflected by dichroic mirror 36 in the direction of the photo cathode target of vidicon 42.

The vidicon 42 is set up with its beam scanning current normally off and the imaged field is temporarily stored on the photo cathode of the vidicon for processing. A ready signal is provided by computer 45 over line 44 to the vidicon to initiate scanning of the imaged field containing a particle to be identified and counted temporarily stored on the photo cathode. The analog output signal from vidicon 42, a serial signal representative of the intensity of the imaged field along the scan lines is sampled by analog to digital converter 46 as heretofore described to provide serial digital data for storage in computer 45. After processing the data for identifying and counting the particle, computer 45 generates a ready signal to vidicon 42 to initiate processing of the next particle field. Furthermore, during processing and analysis of data by computer 45 an inhibit signal is provided over line 47 to the control logic 38 to inhibit processing of further fields containing a particle of the type to be identified and counted until the last particle has been processed.

SAMPLED FIELD DATA PROCESSING

Figure 2A:
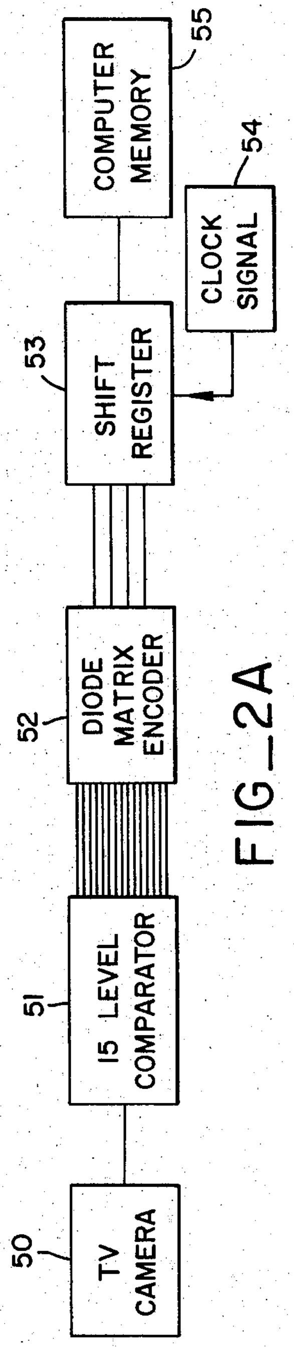
FIG. 2*a* is a detailed block diagram of the analog to digital converter.

In order to provide a practical system for a computer-controlled differential leucocyte counting, the apparatus must be able to process at least one white cell per second. In order to operate within this constraint, the present invention provides means for minimizing the amount of data which the computer must process while still maintaining the necessary degree of accuracy. According to one example, the system is arranged for processing a field of view from a specimen or particle sample comprising 120 by 120 picture elements having an actual dimension of 30 to 40 microns along one 120 element side of the imaged field. A 16 level gray-scale was selected for representing the intensity data about each picture element of the 120 by 120 element field of view. The 16 level gray-scale corresponds to approximately equal increments along a scale from 0 to 15 for representing a range from black to white, i.e., opaque to transparent, with respect to an illuminated specimen. An analog to digital converter for use in the systems of FIGS. 1 and 2 is shown in FIG. 2*a* in which the output from television camera 50 is connected in parallel to a 15 level comparator 51 consisting of 15 comparators set to the selected gray-scale levels. The parallel outputs from the comparators are connected to a 15 bit input diode matrix encoder 52 which serially encodes the input into shift register 53. Timing signals 54 from the computer control the unloading of bits from the shift register into the computer memory.

In the example herein set forth a 45 X fluorite immersion objective lens with a numerical aperture of 0.95 was used. This lens has a theoretical resolving power of 0.35 microns capable of distinguishing between two adjacent picture elements of the 120 by 120 element field, and a depth of focus within the specimen or sample particle field of 0.82 microns. Because the resolving power varies linearly with the numerical aperture, and the depth of focus decreases as the square, it is difficult to use a higher resolving power because of the greater loss in depth of focus.

The 16 level gray-scale used in this example is adequate but more gray-scale levels can be achieved with a more expensive television camera, a more intense light source and greater computer core storage. It is desirable that the gray-scale image data stored in the computer employ the full dynamic range of the television camera, have good gradation in the vicinity of the levels defining the background-cytoplasm and the cytoplasm-nucleus thresholds for applications in cell identification and counting, and be free from television camera shading signals. To achieve these results the following considerations with respect to illumination source, television camera and specimen preparation are desirable.

It has been found that the frequency range of the light source is critical in generating the proper contrast to give 16 meaningful levels. In applications in differential blood cell counting, it has been found that a light source producing a continuous spectrum in the visible range and, in particular, the range from 450 to 600 m$\mu$ provides the optimum contrast and proper gradation. Such an illumination spectrum can be achieved, for example, using a Xenon lamp which produces a continuous spectrum in the visible and attenuating the ends of the range below and above 450 to 600 m$\mu$, respectively, by appropriate interference filtering. Another example light source is a compact source high pressure mercury vapor lamp. The 546 m$\mu$ Hg line provides very high contrast for the red cells and for the nucleus of white cells. The 578 m$\mu$ line (yellow) is also needed to lighten the red cells which are often superimposed thereby appearing darker than the cytoplasm of the white cell. The 436 m$\mu$ line is required in order to enlighten the blue of certain white cell nuclei. Thus, the light from the mercury vapor source is again filtered to transmit light in the range of substantially 450 to 600 mμ.

For the television camera, an RCA 8507 vidicon and COHU 3000 series camera can be used by way of example. The COHU 6000 series camera and a plumbicon camera tube also provide advantages. In order to eliminate shading signals which may arise from nonconformity in the photo cathode, electron circuitry can be used to compensate for the non-uniformity since the resulting shading signals have a constant configuration. Furthermore, since the conditions for focusing the electron beam scanning cathode vary with the position on the scanning raster, correction signals may be introduced into the focus coil to improve the focus in the corners of the image. Such improved focus yields better separation of the gray-scale levels.

As previously mentioned, variations in the specimens and particle samples such as, for example, blood smears, can produce great variations in the color, contrast and clarity of the specimen. It is thus important that uniform control be exercised over specimen preparation including, for example, the level of staining.

A specimen field of, for example, approximately 30 to 40 microns square is imaged on the photo cathode target of the television camera and digital data representing a field of 120 by 120 picture elements is stored in the computer. In differential white blood cell counting applications, the specimen field includes a white blood cell having a diameter in the range of approximately 6 to 15 microns. For a person in normal health, there are about 500 red blood cells having a diameter of approximately 7.5 microns, for every white blood cell so that on the average the white cells are about 200 microns apart. It is therefore unlikely that two white cells will be included in the same field of stored data. This, however, may occur and is handled as subsequently described.

In analyzing the digital data representing 120 by 120 picture elements of the sampled image field, an initial reconnoitering is carried out by sampling every sixth element on every sixth line to generate a less dense subfield of 20 by 20 picture elements. Thus, the first sample field of digital data having a 120 by 120 picture element resolution is itself sampled to provide a less dense second sampled field having a 20 by 20 picture element resolution. The purpose and function of this operation is to find out where certain particle or cell boundary threshold levels should be placed using only a small fraction of the stored data. In particular, the elements of the less dense sampled field are analyzed to find out the gray-scale value separating the nucleus from the cytoplasm and/or the gray-scale value separating the cytoplasm from the background without having to analyze all of the digital data in the first sampled field of higher resolution. It is not possible to use fixed values for these transition thresholds since they vary with drift in the video amplifier of the television camera and also with the intensity of the staining specimen, and threshold level determination is described subsequently.

Having found the nucleus cytoplasm threshold at lower resolution, all of the picture elements in the second field with gray-scale value less than this along a scale in which the 0 level is opaque and 15 level is transparent, are counted and the nuclear area determined. If a substantial number of points are at level 0 the specimen can be rejected as an artifact. The center of gravity or centroid of the nuclear area is also determined. The next step of the program in directing data analysis is to find a box or enclosure around the white cell in order to exclude as much as possible of the stored digital data thereby minimizing the quantity of data which must be analyzed in identifying the particle. Thus, the box must be tight and box-finding algorithms are described subsequently. After a box or enclosure has been determined for circumscribing those picture elements defining a white blood cell, attention is confined exclusively thereafter to processing the data inside the box to exclusion of digital data about the field outside of the box. This is analogous to improving the signal to noise ratio where the red cells which fill the background constitute the noise. The initial box or enclosure is determined on the basis of elements of the second sample having a 20 by 20 resolution so that the time required is very short. The process of threshold determination is thereafter repeated using all of the digital data from the first sampled field at the 120 by 120 resolution but analyzing only the contents circumscribed by the box rather than the entire field. A new nuclear area and new center of gravity are determined and a more precise box is defined. All subsequent analysis is carried out on the contents of the defined or corrected box. An advantage of this procedure is that if a second white blood cell overlaps the edge of the 120 by 120 field, it will normally be excluded by the first box circumscribing the picture elements defining a complete white blood cell and the data corresponding to which are to be analyzed in detail.

Thus, the speed and efficiency of the method contemplated by the present invention depends to a considerable extent upon defining a close fitting box around the picture elements corresponding to a white blood cell or other detected particle to be identified, and processing in detail only that fraction of the stored digital data corresponding to the picture element circumscribed by the box. For the system set forth by way of example herein, this fraction is in the order of one-tenth of the stored data for a particular specimen field. In applications in differential blood cell counting and differential counting of other forms of cells, a box or enclosure of circular shape is most effective for excluding extraneous data. Square and rectangular boxes, however, are also effective and lead to simpler bookkeeping in the computer programs which direct analysis of the data. Although boxes or enclosures of various shapes from circular to rectangular can be used, the rectangular box usually has portions of red blood cells in its corner regions which are counted as part of the cytoplasm area of the white blood cell enclosed by the box. As a consequence, the parameter "cytoplasm area" as determined by the computer program bears little relationship to the actual cytoplasm area of the cell because of its inclusion of red blood cell cytoplasm in the calculation. This presents little problems in the system of the present invention, however, because cell particle identification can be effectively accomplished without the use of the parameter "cytoplasm area." A good fitting circular box, however, can eliminate most of the extraneous red blood cell material, thereby making the parameter "cytoplasm area" a meaningful parameter for computing and evaluating the nature of the cell.

NUCLEUS-CYTOPLASM THRESHOLD

Describing in detail the procedure summarized generally above, the first step in the program for analyzing stored data representing an image field of 120 by 120 picture element resolution containing a particle to be identified is to find the gray-scale level that is to be regarded as defining the boundary between the white blood cell nucleus and cytoplasm. The determination of the nucleus cytoplasm threshold is carried out on a less dense second sampled field of 20 by 20 resolution as heretofore described. One of several criteria can be utilized for selecting the nucleus cytoplasm threshold which information is utilized in calculating the nucleus area.

A simple method for locating the nucleus cytoplasm boundary of a white cell, i.e., the gray-scale threshold level corresponding to the nucleus-cytoplasm boundary on a level gray-scale where 0 is opaque and 15 is transparent, is to select a gray-scale level just below the red cell range, i.e., one level below the lowest red cell level. Such a threshold level may be, for example, at level 8. Although this simplified procedure generally works, the selected level may be too low for faintly stained monocytes and, moreover, red cells are often superimposed on each other so that the optimum choice for the threshold may have an extremely narrow range of permissible values. Variations in coloration and staining are also a problem.

Another approach which gives more accurate results is to find the lowest gray-scale level of the nucleus having more than, for example, 20 picture elements at that level. The program is arranged to select for the threshold level a level which is three levels above this value. This procedure has been found to work quite satisfactorily.

According to the preferred method for defining a nucleus cytoplasm threshold, however, a histogram of all the picture elements of the less dense second sampled field is developed showing the number of picture elements occupying each level of the gray-scale. Because such histograms are typically "noisy" a smoothing operation is performed by, for example, replacing the number of elements for a particular gray-scale level with the average of that level and the two adjacent levels above it and below it. For example, according to this simple smoothing method, the value for level 6 would be replaced with one-third the sum of the number of elements found for levels 5, 6 and 7. The smoothed histogram is inspected for local minima which provide values for the cytoplasm nucleus threshold and the cytoplasm background threshold. Such a histogram is illustrated, by way of example, for a lymphocyte in FIG. 4*a*. The corresponding FIG. 4 displays a picture of the lymphocyte quantized into three regions, namely, nucleus, cytoplasm and background by the two thresholds determined from the minima in the histogram. "Cytoplasm" from red blood cells can be seen in the corners of the box and is included in the cytoplasm determination. If a local minimum is not found in the range level 2–10, the cell is either a monocyte or an eosinophil and a default threshold must be used selected according to either of the first two procedures mentioned above yielding a level of, for example, 8, 9 or 10. While the level 10 is generally too high, the over-estimate is a good deviation in that it acts to increase the size of the box or enclosure subsequently computed and the box or enclosure for monocytes and eosinophils tends to be too small, as hereinafter further described.

Once the nucleus-cytoplasm threshold has been determined, the nuclear area can be calculated by counting the number of picture elements that have gray-scale values below the nucleus cytoplasm threshold level. The computer program, in addition, provides for computation of the centroid or center of gravity of the nuclear area as the central point from which a box or enclosure containing the white cell is to be drawn. Once the nuclear area and centroid have been determined, a variety of procedures can be utilized for defining a box or enclosure having a center at the centroid of the nuclear area and which encloses the white cell.

BOX-FINDING ALGORITHMS

One simple algorithm for defining a box consists of defining a circule having an area in the order of 1.5 to 2.5 times the area of the nucleus and centered at the nuclear center of gravity. Although this procedure generally works satisfactorily, giving good results for lymphocytes and monocytes, a box or enclosure defined in this manner is sometimes distinctly on the small size for neutrophils ane eosinophils because the nuclear area is small for the size of the cell. An algorithm which improves this result slightly is one which adds a squared term according to the following equation where $A$ and $E$ are constants and $R_o$ is the radius of a circule of area equal to the area of the nucleus:

$$\text{Box radius} = AR_o + BR_o^2$$

By adding the squared term, some compensation is provided because the big cells usually have a greater proportion of cytoplasm. But still the box may be too small for neutrophils which may have the same nuclear area as a small lymphocyte and yet have twice the diameter.

Figure 5:
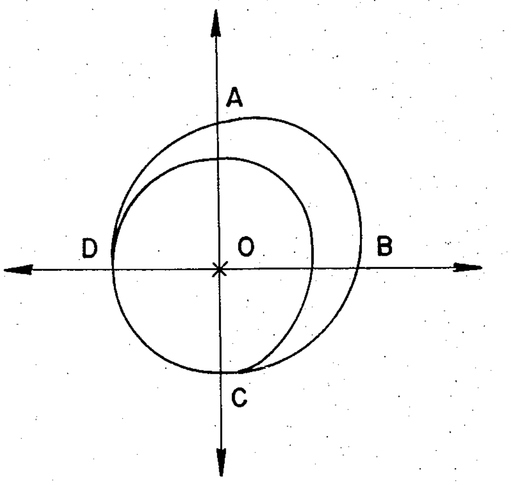
FIG. 5 is a diagrammatic view of one box-finding technique using rays.

A second approach for finding a box or enclosure for the cell is by the use of rays directed outward from the centroid to detect the boundaries of the cell. For example, from the centroid four rays are sent out in the north, east, south and west directions, and each ray is extended until the signal level reaches the value previously determined as corresponding to the boundary between the cytoplasm and the background. The cytoplasm background threshold can be determined from a histogram in the manner heretofore described. As shown in FIG. 5, the four points define the edges of the cell, i.e., *a*, *b*, *c*, and *d*. For bookkeeping convenience, in the computer program, a rectangular box can be defined having each of the intersections along one side of the box as shown by the dotted lines. With high quality and uniform specimen preparation, this procedure provides good results in defining a tight box.

However, many specimen preparations have red blood cells in contact with the white blood cells so that the extended rays continue on beyond the white cell boundary through the red cell and define the boundary between the red cell and the background. The resulting box is considerably larger than the white cell it is intended to enclose. Because this generally occurs only in one out of the four rays, it is possible to set a standard for what constitutes an acceptable length and if one of the rays is too long, an estimated value is substituted derived from the other three measurements, presumably correct. In a very poor preparation, two or more red cells may make contact with the white cell, thus making it necessary to use eight rays diverging from the nuclear centroid and spaced at 45° to assure that useful data is obtained. The computer program bookkeeping is then more complicated and time-consuming. Another defect in this procedure is that the center of gravity of the nucleus of a neutrophil often lies within cytoplasm which is very faint, faint enough to be equal to the level defined for the cytoplasm background boundary. In this event, the ray drawing algorithm stops right at the start, not extending at all from its starting point. Or, alternately, the cytoplasm may be so faint that a cytoplasm background boundary was never detected and does not exist in the stored data. To alleviate this situation, the computer program provides for starting the rays out some distance from the center of the nucleus, the distance derived from the nuclear area. With this addition, the ray drawing technique provides improved performance.

Figure 3:
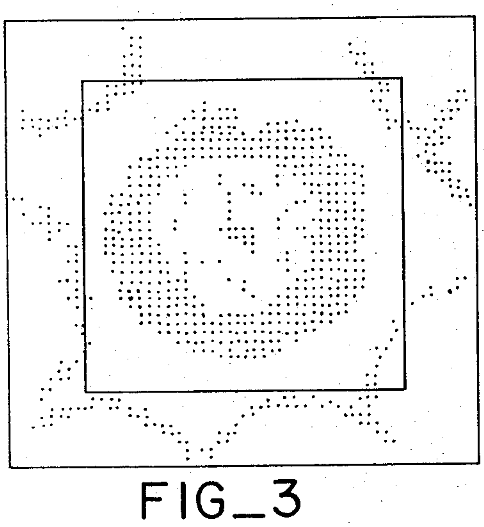
FIG. 3 is a diagrammatic outline image displaying the gradient of the density for a particle "enclosed" by a box.
Figure 4:
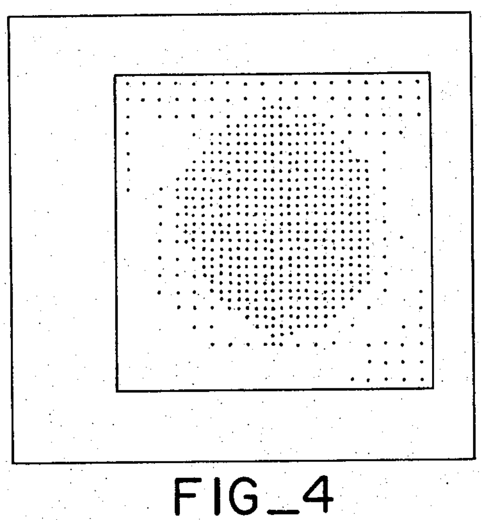
Figure 4A:
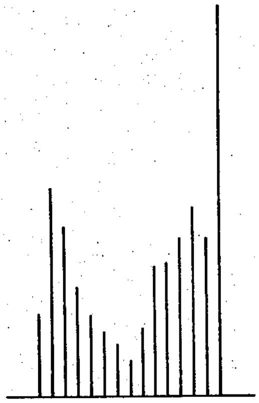
FIG. 4*a* is a histogram of the picture elements.

The preferred box-finding algorithm, however, which provides superior results involves the use of what is referred to herein as a fill-in subroutine. The main problems with boxfinding according to the aforementioned algorithms is caused by the neutrophils which have highly irregular nucleus configurations and a relatively high ratio of cytoplasm area to nuclear area. Although each of the aforementioned methods works adequately, there is a tendency to define boxes or enclosures which are too small for the neutrophils. According to the fill-in subroutine for the preferred method of box-finding, the nuclear picture elements are inventoried and divided into two types, interior and exterior, namely, elements completely within the nucleus and elements forming the boundary of the nucleus. Thus, an interior element has all its neighbors within the nucleus, while an exterior element has at least one neighbor outside the nucleus. According to the fill-in subroutine, a modified nuclear area is generated by applying a rule that all adjacent elements not belonging to the nucleus but adjacent to an exterior element are included as a nuclear element. This rule is applied at the low resolution, less dense, 20 by 20 element sampled field during the initial reconnoitering of the data and has the effect of filling in most of the interior of an irregular shaped neutrophil nucleus, while only slightly enlarging the comparatively regular and circular nuclei of the other types of white blood cells. The area of the expanded nucleus is thereafter used in computing the size of the box as, for example, a circle having an area in the range of approximately 1.5 to 2.5 times the enlarged nuclear area derived from the fill-in subroutine. Alternatively, a square or rectangular box can be used having an area in the same range. White blood cells in a specimen or sampled field enclosed by rectangular boxes are shown in FIGS. 3 and 4. The illustration in FIG. 4 is a two-level quantized picture of a lymphocyte showing the major nuclear portion in larger dots and the minor cytoplasm portion surrounding it in smaller dots, including portions of the cytoplasm of red blood cells at corners of the box.

PARTICLE IDENTIFICATION PARAMETERS

Once the box or enclosure has been defined at lower resolution from the second sampled field of picture elements the data within the box, and only the data within the box, is analyzed at the higher resolution of 120 by 120 picture elements in order to more accurately determine the nuclear cytoplasm threshold, nuclear area and centroid. The box or enclosure is then more accurately defined for excluding extraneous data and the remaining data within the box is analyzed at the higher resolution for evaluating the category in which the cells should be placed for purposes of identification. Thus, computer processing at higher density is only carried out on data circumscribed by the box thereby reducing computer time and capacity required.

In order to provide accurate identification seven categories of white cells have been defined: young neutrophils, old neutrophils, large lymphocytes, small lymphocytes, monocytes, eosinophils, and basophils. Separation into seven categories has been found necessary in order to provide meaningful differentiation between lymphocytes and monocytes, on the one hand, and neutrophils and monocytes, on the other hand, because of the variability that occurs in lymphocytes and neutrophils. Thus, even experienced technicians will sometimes confuse large lymphocytes and monocytes, on the one hand, and young neutrophils and monocytes, on the other hand. Separation into seven categories reduces the recognition error rate by permitting better definition of prototype points hereinafter described. Furthermore, the distinction is of value medically because a preponderance of young cells, with fewer mature cells, referred to as a "shift to the left," is an indication of infection. A select group of parameters is used for differentiating the seven categories of white cells and evaluation and categorization of cells is accomplished by a distance measure based upon similarity and biased by the trustworthiness of the data.

The particular parameters have been found to provide a powerful algorithm for distinguishing and identifying particles. Up to eight parameters can be used but as few as four, and even less, provide effective performance. In fact, one of the parameters, a derived parameter, is alone 90 percent effective in identifying and categorizing particles.

This powerful parameter, a dimensionless number derived from the nuclear perimeter and nuclear area and equal to the square of the nuclear perimeter $P$ divided by the nuclear area $A$ ($P^2 / A$) can be combined with three other parameters to provide almost 100 percent accuracy in identifying and categorizing normal cells. Thus, the nuclear area the nuclear perimeter $P$, and the difference between the average nuclear and cytoplasm intensity or gray-scale level when combined with the parameter $P^2 / A$ provide an algorithm for almost 100 percent accurate identification of white cell types.

Other parameters can also be used to further increase the accuracy and provide redundant assurance. Such additional parameters include the average nuclear intensity or gray-scale level, the minimum nuclear intensity or gray-scale level, the cytoplasm area, and the ratio of cytoplasm to nuclear area. It has been previously pointed out, however, that the cytoplasm area parameter has very little meaning because it is considerably increased by an unknown amount of red cell area unless a tight circular box is defined. This also means that the ratio of cytoplasm to nuclear area is also of doubtful value unless a tight circular box can be defined. The parameters average nuclear intensity or gray-scale level, and minimun nuclear intensity or gray-scale level tend to convey the same information and may be subject to variation as the result of a wandering D.C. level in the television camera. Under various conditions, however, these parameters may add reliability to the results.

The values for the most powerful parameter, $P^2 / A$ are shown in the following Table 1:

TABLE 1

| | |
|---|---|
| Small Lymphocytes | 12–15 |
| Large Lymphocytes | 13–17 |
| Monocytes | 18–33 |
| Young Neutrophils | 24–46 |
| Old Neutrophils | 40–70 |
| Eosinophils | 70–300 |
| Basophils | 100–150 |

The overlap between the various ranges tends to be quite small and in fact occurs in the region of confusion for even skilled technicians as, for example, between large lymphocytes and monocytes, on the one hand, and between monocytes and young neutrophils, on the other hand. The indicated range for basophils is derived from a relatively small number of samples and updating is desirable as more samples have been tested.

CELL CATEGORIZATION

As previously mentioned, identification and categorization of cells takes place on the basis of a distance measure or measure of closeness to a set of prototype points representing typical cells from each category derived from historical data developed by skilled technicians. For *m* categories of cells, *m* prototype points are defined in an *n* dimensional space where *n* is the number of different parameters used in identification and categorization of the cells. Thus, in the example referred to above, there would be seven prototype points representing the seven categories in a space of four or more dimensions, depending upon the number of parameters selected for use in identifying the cells. Each of the prototype points is located by the mean values of each parameter for each category as derived from a representative selection of cells examined by experienced technicians skilled in the art. Along with each of the mean values for each category is also stored the standard deviation of that parameter for that particular category. Because of the variability of cells, a statistically reliable number of representative cells must be inspected and their parameters measured providing reliable mean values and standard deviations for each of the categories for defining the prototype points.

Once the *m* prototype points have been located in the *n* dimensional space, the likelihood of a particular new cell belonging to a particular category is determined by an evaluation of a distance measure or measure of closeness to each of the prototype points. The distance measure is in the nature of an average distance of the parameters over the eight dimensions, the distances normalized along each dimension with respect to the standard deviation.

Thus, the eight parameters or variables may be regarded as forming an *n* dimensional vector space with axes *s*, *t*, . . . *z*. The *n* mean values for the *n* parameters that refer to a particular type of cell define a prototype point in the vector space, *m* prototype points for the *m* categories. The first step in evaluating a new cell is to measure values for the *n* parameters which together define a point describing and locating the cell in the *n* dimensional space. Its distance from the prototype points provides a measure of similarity. A particularly reliable measure is derived by normalizing with respect to the standard deviation along each dimension, the standard deviation being derived from the representative selection of cells used in defining the various prototype points. The *m* categories labeled 1, 2. . . *m*, and *n* parameters *s*, *t*, . . . *z*, provide *mn* mean values labeled $\bar{s}_1, \bar{t}_1 \ldots \bar{z}_1; \bar{s}_2, \bar{t}_2 \ldots \bar{z}_2; \bar{s}_m, \bar{t}_m, \bar{z}_m$. The standard deviations for each of the parameters are $s\sigma m, t\sigma m, \ldots z\sigma m$ for the $m^{th}$ prototype point. For example, for the first parameter of the first category having a mean value of $\bar{s}_1$, the standard deviation is $s\sigma_1$. The distance used as a measure of closeness is an average of the parameters from the prototype point normalized along each dimension with respect to standard deviation and given by:

$$\text{Distance} = 100 \left[ \frac{k_1^2\left(\frac{s-\bar{s}_m}{s\sigma m}\right)^2 + k_2^2\left(\frac{t-\bar{t}_m}{t\sigma m}\right)^2 + \ldots k_8^2\left(\frac{z-\bar{z}_m}{z\sigma m}\right)^2}{k_1^2+k_2^2+k_3^2 \ldots + k_n^2} \right]^{1/2}$$

The symbols $k_1^2, k^2_2, \ldots k_n$ are weighting coefficients normally set equal to unity for parameters used in the calculation and 0 for those to be eliminated. With unity weighting coefficients, a value of 100 for the distance derived from the above equation corresponds to an average of one standard deviation along each dimension.

With the average distance from the prototype points of a particular cell known in standard deviations, the distances from each of the *m* categories provide estimates of the similarities to the various prototypes.

After the average distance of a particular specimen cell from each of the prototype points has been evaluated according to the above procedure, the distances can be ranked and a distance criterion selected for categorizing the specimen. For example, good specimen cells tend to fall within 1.5 standard deviations averaged over the *n* dimensions of the respective prototype points, whereas at distances greater than 2.0 standard deviation the specimen cell should probably be excluded. In determining distance measurements, the sensitivity of the various parameters and mutual independence of the parameters can be evaluated, and the respective weighting factors adjusted to compensate for mutual dependence of the parameters and for the relative efficacy of the parameter as a distinguishing feature of the cells. By setting the weighting factor to 0 a particular parameter can be eliminated, and by varying the weighting factor, the extent to which a particular parameter influences the evaluation can be controlled.

The quality of blood cell slide preparations varies considerably according to conventional procedures. The variations are due to several causes, including non-uniformity of the stain, such as, for example, Wright's Stain, imperfect control over the staining time and washing time, inadequate cleanliness of the glass, and the body chemistry of the patient. With strict controls, however, uniformly excellent preparations can be achieved as the problem of blood cell slide quality is primarily one of exercising control over these variables. Commercial batch processing is available and may improve the uniformity in preparation.

The present invention includes several features to compensate for the variability of staining to provide the gradation necessary to preserve gray-scale in the television camera used in the present invention. Thus, the data processing algorithms determine optimum values for the nucleus cytoplasm threshold and the cytoplasm background thresholds on a relative scale according to the level of staining of the slides. Also, the primary parameter selected for identification and categorization of the cells are relatively independent of the level of staining. Thus, the parameters' minimum nuclear brightness, and average nuclear brightness, which are disturbed both by the intensity of the staining and the stability of the D.C. level of the television camera can be eliminated during cell identification.

The invention also contemplates an additional technique for counteracting the effect of variations in the staining level on categorizing particles, especially in separating large lymphocytes from monocytes. This programming technique involves updating the mean values used to define prototype points for each blood cell slide. For example, the first 100 cells of a blood smear are identified according to the distance measure from the prototype points based upon historical measurements as heretofore described and the 100 cells are divided into two groups, those within, for example 1.25 standard deviations of the prototype points, and those beyond this cutoff point. There is reasonable assurance that the first group of cells within 1.25 standard deviations are correctly categorized and the measurement of the parameters for this first group of cells is used to adjust the mean values of the parameters defining the prototype points. After the parameters have been stored and the prototype points updated, the cell categories can be recomputed for all the cells of the smear to provide the standard count for 200 cells.

A mechanized and reproducable method of specimen handling and preparation is advantageous for use with the computer controlled differential particle counter of the present invention in providing uniformity. Such specimen preparation equipment is available from the Vickers Company in England, under the name, Vickers' Cytological Scanning Apparatus (VCSA). This equipment uses a reel of plastic tape, for example, 200 feet long with specimens spaced 1 foot apart. The specimen preparation is entirely automated. Red cells can be eliminated from the specimens by lysing the red cells, centrifuging, and re-suspending the centrifuged white cells.

PRESERVATION OF FOCUS

Proper focus of the specimen image is necessary in order to obtain meaningful television camera data for processing by the computer. Because the depth of focus of the microscope objective is less than a micron and the thickness of the specimen is comparable, the present invention provides a variety of arrangements for preserving focus in the micron range.

A glass slide 60 is supported by rigid rollers 61 spaced beneath the microscope objective 62. The rollers 61 are fixed relative to the microscope housing. The space between the upper surface 63 of slide 60 and the microscope objective 62 is filled with immersion oil 64. The slide is oriented so that the specimen is on the bottom surface 65 of the slide 60 which is in contact with the rollers 61. The immersion oil 64 is selected to have an index of refraction the same as that of the medium comprising the glass slide 60 so that the space between the lower lens of the objective 62 and the specimen at surface 65 is filled with material of uniform refractive index.

The rollers 61 define a rigid plane *P* at which the objective 62 is in perfect focus. This plane is also the plane of the specimen. The slide 60 is moved across the rollers 61 to provide different fields of view for imaging on the television camera and even though the slide varies in thickness as it is moved over the rollers, the image projected by lens 62 remains in sharp focus because the entire region between the objective and the specimen is filled with media of uniform refractive index and the plane *P*, the plane of the specimen, is rigidly defined.

Figure 7:
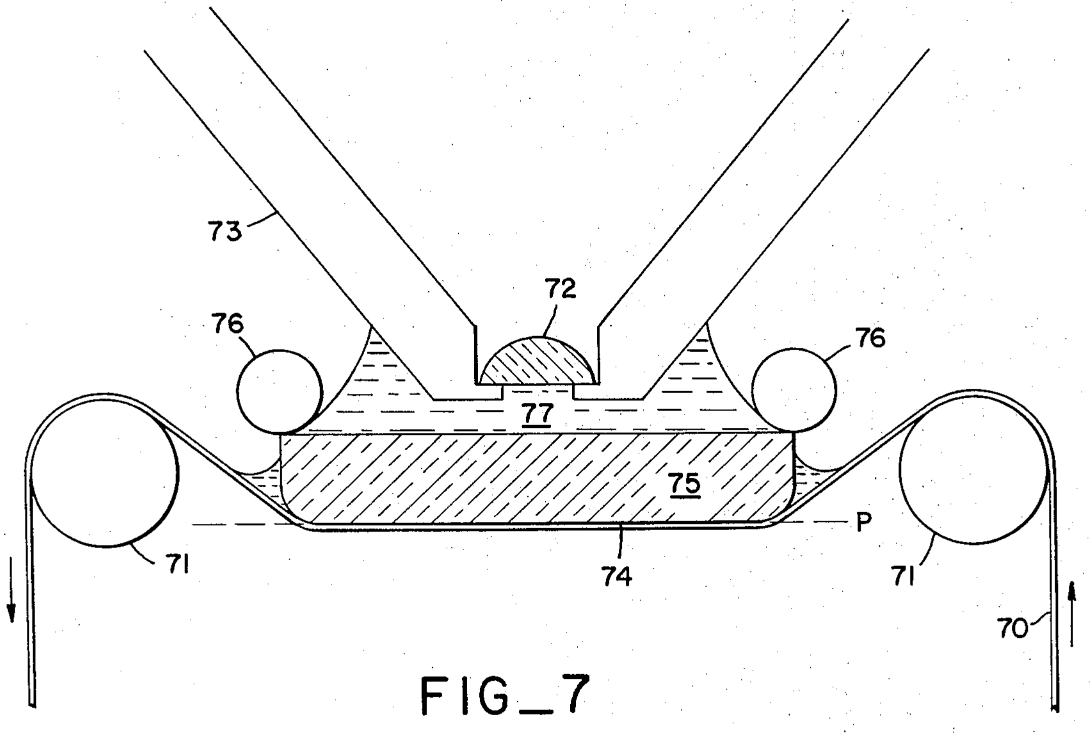
FIG. 7 is an arrangement for preserving focus when the specimens are fixed to a reel of continuous tape.

FIG. 7 shows another arrangement for preserving focus in which the specimens are fixed on an elongate tape 70 supported by idler pulleys 71 which passes beneath the objective 72 of microscope 73. In this arrangement, a rigid plane P is defined by the lower surface 74 of glass slide 75. The glass slide 75 is supported against rollers 76 maintained in fixed position relative to the microscope housing. The tape 70 is oriented with successive specimens formed on the upper surface of the tape so that each specimen is pressed against the lower surface 74 of glass slide 75 by the tension of the tape, or, alternatively, by some spring mechanism from beneath. Immersion oil 77 fills the space between microscope objective 72 and slide 75 and also between the tape 70 and slide 75.

Figure 9:
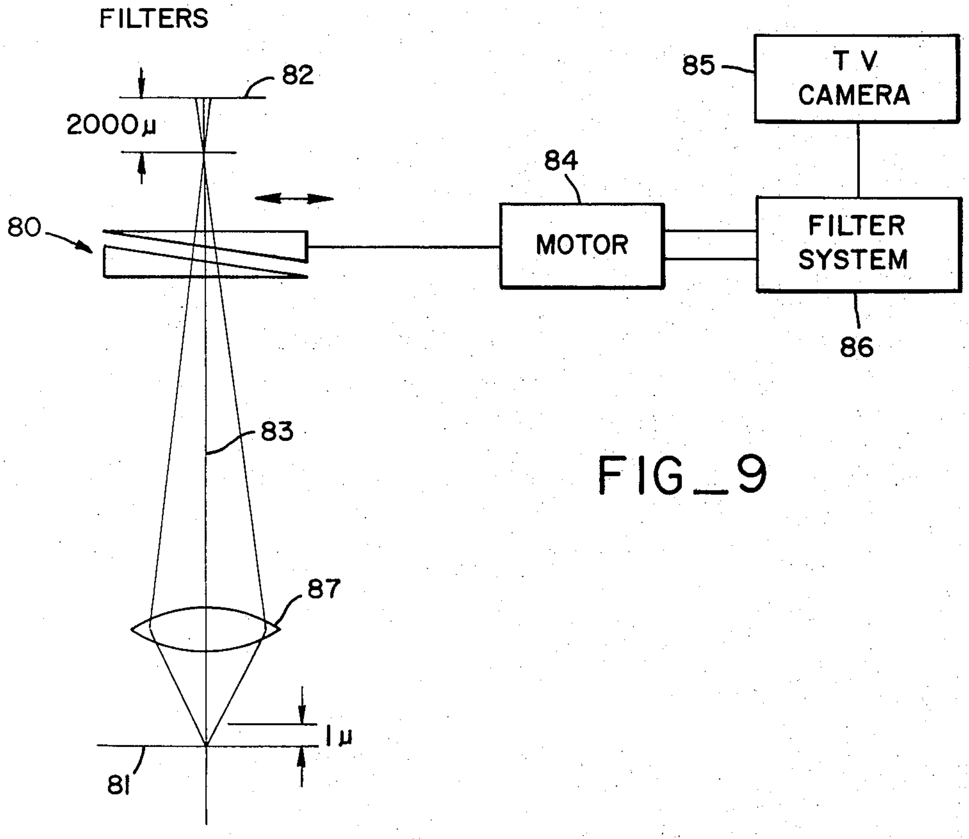
Figure 8:
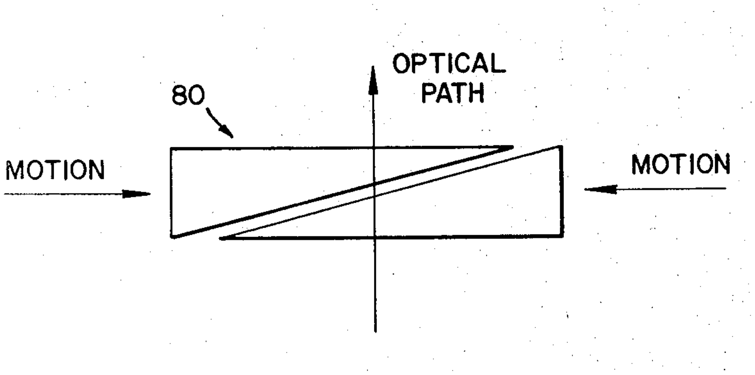
FIG. 8 is a side diagrammatic view of a pair of optical wedges for use in the automatic focusing system of FIG. 9.
Figure 6:
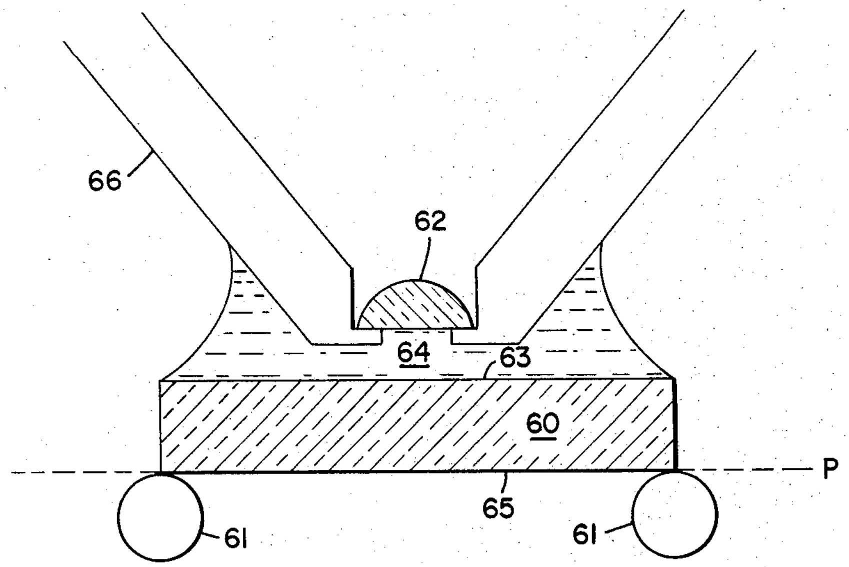

An alternate arrangement for preserving focus consisting of an automatic focusing device using a servo loop is shown in FIGS. 8 and 9. Because the variations in the focal plane are in the micron range, the focus correcting mechanism has extremely fine adjustment. Thus, instead of using the microscope fine motion adjustment, a pair of compensating wedges is positioned in the microscope image light path to effectively provide a transparent plate of variable thickness for controlling the optical path length. This can be accomplished by positioning the pair of optical wedges 80 between the microscope objective 87 and the projection eyepiece as shown in FIG. 9. The optical path is varied by moving one or both of the wedges 80 in a direction transverse to or perpendicular to the optical path. To provide a shift of one micron in the specimen focal plane 81 requires a change in the order of 2 millimeters in the image plane. This change in the optical image path is accomplished by changing the effective thickness of the plate formed by the pair of optical wedges. Variation in the thickness is accomplished by motion of one of the wedges in a direction perpendicular to the optical path 83 driven by motor 84. The error signal used to drive the motor 84 is derived from the video output of television camera 85 on the photo cathode of which is imaged the specimen. The video output from television camera 85 is passed through a filter system 86 which extracts from the video signal a frequency range in which the signal varies functionally with the degree of focus of the image. For applications in differential white blood cell counting, a band pass filter having a frequency range from 400 to 900 kilohertz provides a relatively broad maximum in signal variation as the focal plane varies over a range of plus or minus one micron with respect to the specimen plane. This band pass filter thus provides a course control signal for application to motor 84. Furthermore, a band pass filter having a frequency range of approximately 900 to 2,000 kilohertz normally provides a small output from the video signal except when the boundaries of the red cells are in crisp focus. This higher frequency band pass filter thus provides a fine control signal for providing a final precise focus setting by a motor 84.

As a practical matter, the control signal derived from television camera 85 via filter system 86 may cause ringing of the filters. In order to avoid filter ring the control signal is derived from a gated section of the horizontal sweep of television camera 85, for example, the range 20–50 microsecond of the 63.5 microsecond sweep time.

I claim:

1. A system for differentiating and counting particles of the type in which an illuminated particle field is imaged by a microscope onto a scanning target comprising:

a beamsplitter positioned in the image beam path from the microscope, said beamsplitter positioned to direct a first portion of image light along a first path to the scanning target and to direct a second portion of image light along a second path;

a row of photocell means positioned in the second path from said beamsplitter;

and logic circuit means coupled with the output from said row of photocell means for generating a ready signal indicating the presence in the imaged field of a particle to be differentiated and counted.

2. A system for differentiating and counting particles as set forth in claim 1 wherein said scanning means comprises a television camera having a photocathode target on which the image of the flash illuminated specimen in the microscope objective field is temporarily stored for scanning and generating an electrical signal.

3. A system for differentiating and counting particles of the type in which a particle field is imaged by a microscope onto a scanning target comprising:

a first source of light for continuously illuminating the particle field with light in the infrared range;

a second light source for providing a flash illumination of the particle field upon the occurrence of a trigger signal;

a dichroic mirror beamsplitter means positioned in the image beam path from the microscope, said beamsplitter positioned to direct image light in the visible range to the scanning target and to pass image light in the infrared range in another direction;

a row of photocell means positioned in the infrared light path from said beamsplitter;

and logic circuit means coupled with the output from said row of photocells for generating a trigger signal indicating the presence in the image field of a particle to be differentiated and counted.

4. A system for differentiating and counting particles of the type in which a particle field is imaged by a microscope onto a scanning target comprising a first light source for illuminating the particle field with light of a first frequency range, a second light source for illuminating the particle field with light of a second frequency range, means for directing image light from the particles having the first frequency range to the scanning target and for directing image light from the particles of the second frequency range in another direction, sensing means positioned for receiving the image light of the second frequency range, means for generating a trigger signal in response to the receipt of light of the second frequency range by the sensing means, and means for momentarily activating the first light source with the trigger signal.

* * * * *